Figure 3:
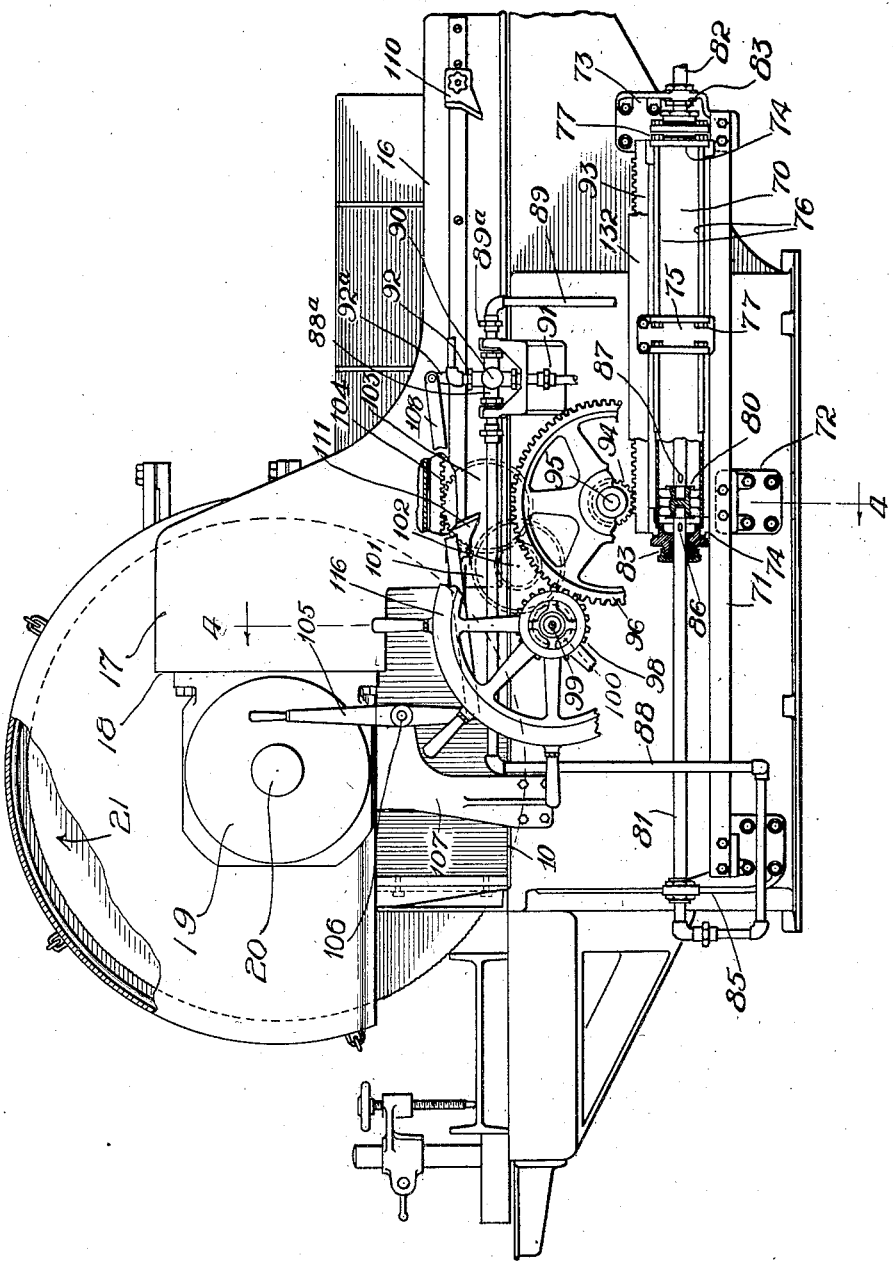

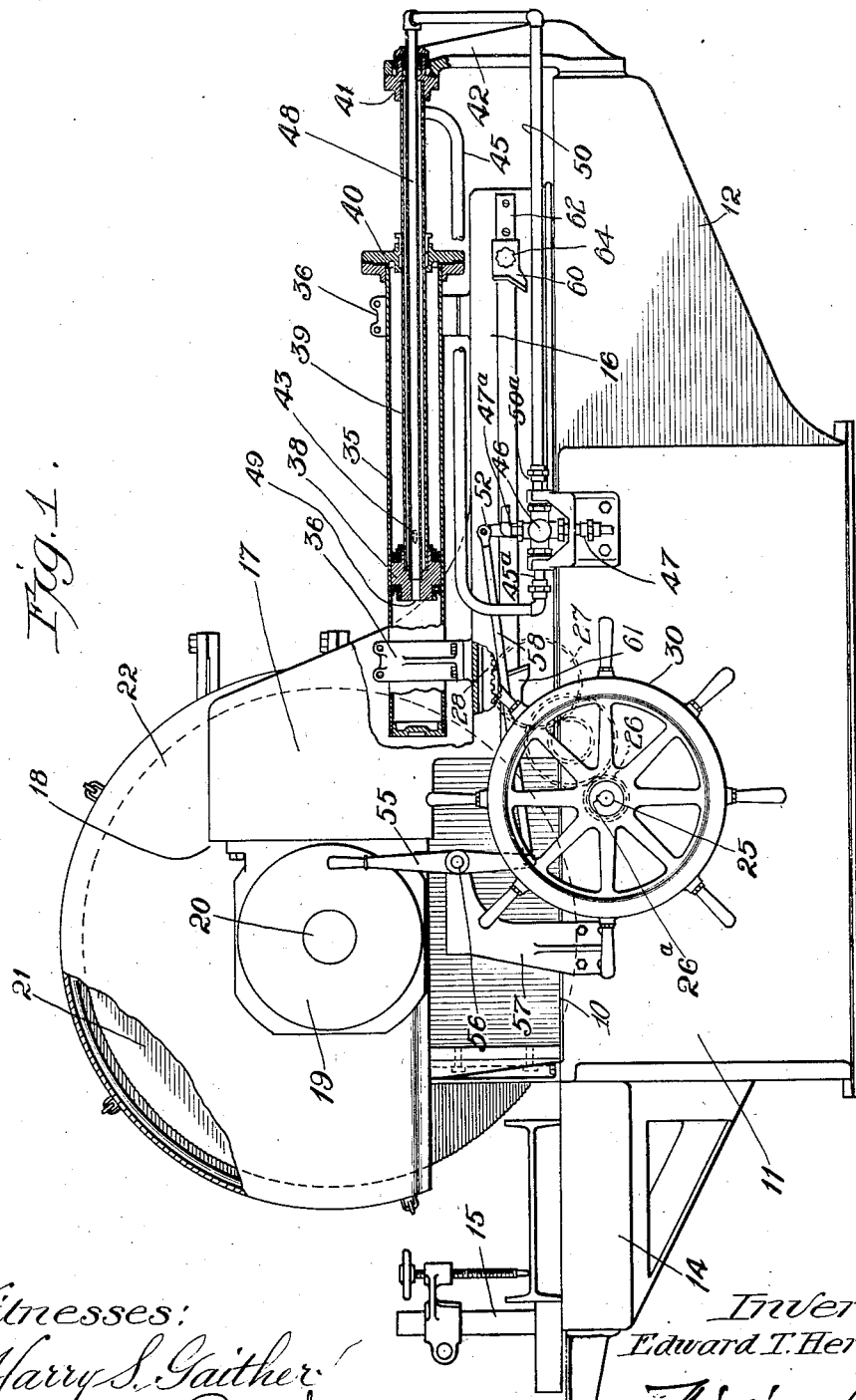

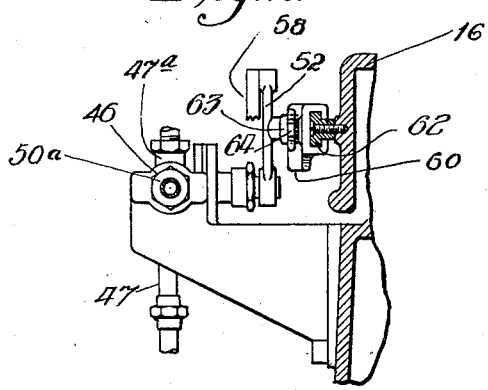
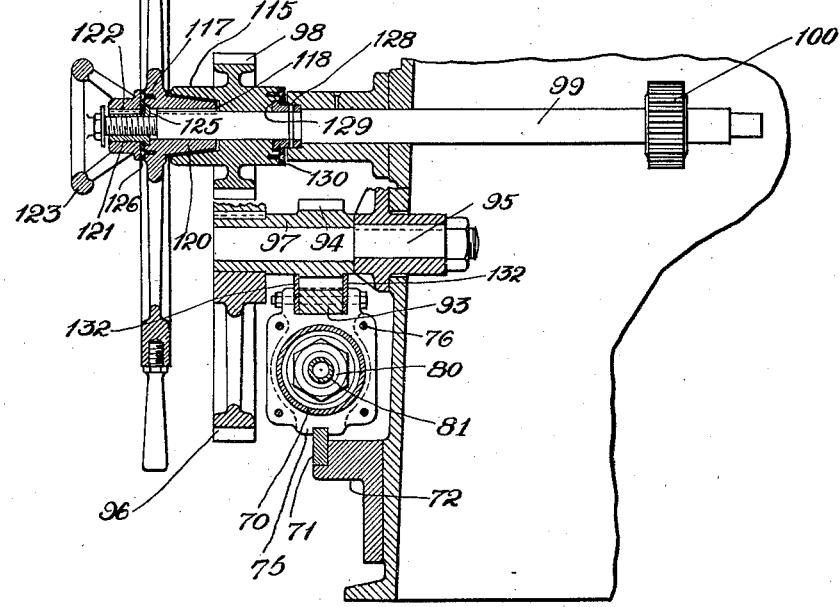

E. T. HENDEE.
FRICTION CUTTING MACHINE.
APPLICATION FILED SEPT. 18, 1913.

1,105,140.

Patented July 28, 1914.
3 SHEETS—SHEET 3.

Witnesses:
Harry S. Gaither
Gertrude E. Dowle

Inventor:
Edward T. Hendee
by William H. Hogg
Atty

UNITED STATES PATENT OFFICE.

EDWARD T. HENDEE, OF CHICAGO, ILLINOIS.

FRICTION CUTTING-MACHINE.

1,105,140.   Specification of Letters Patent.   Patented July 28, 1914.

Application filed September 18, 1913. Serial No. 790,406.

*To all whom it may concern:*

Be it known that I, EDWARD T. HENDEE, a citizen of the United States, and a resident of Chicago, in the county of Cook and State of Illinois, have invented certain new and useful Improvements in Friction Cutting-Machines; and I do hereby declare that the following is a full, clear, and exact description thereof, reference being had to the accompanying drawings, and to the characters of reference marked thereon, which form a part of this specification.

This invention relates to improvements in friction cutting machines or saws for rapidly cutting plates, bars and shapes by engagement of a high speed cutting disk with the work.

The present invention relates to mechanism for feeding the saw to its work and is more especially applicable to the type of machine shown in my co-pending application for U. S. Letters Patent, Serial No. 790,405, filed of even date herewith.

The object of the present invention is to provide a combined hydraulic, or pneumatic, and hand operated feed mechanism for advancing the saw to the work, and the invention consists in the matters hereinafter set forth and more particularly pointed out in the appended claims.

In the drawings: Figure 1 is a side elevation, with parts in section, and other parts broken away, of a friction cutting machine embodying my invention. Fig. 2 is a detail of the valve for controlling the flow of the motive fluid (either liquid or air) to the cylinder of the feed mechanism. Fig. 3 is a side elevation, with parts broken away and with other parts in section, of a modified form of the combined hydraulic, or pneumatic, and hand feed mechanism. Fig. 4 is a sectional view on the line 4—4 of Fig. 3.

Inasmuch as the improvements constituting the present invention relate to the means for feeding the saw to its work, reference is hereinafter made to the parts of the machine not directly associated with my present invention in a general way only, such features being fully disclosed in my aforesaid application.

As shown in the drawings, 10 designates the fixed horizontal bed plate of the machine which is mounted upon or is made part of the frame 11. The said frame is provided at its rear end with an extension 12 to support the saw carriage when in its retracted position, and is provided at its forward end with a work table 14, the latter provided with any suitable form of work holder 15.

16 designates a carriage which is supported upon and is movable longitudinally of the bed plate and which may be supported on the bed plate through the medium of suitable bearing rollers, such as are shown in my aforesaid application. The carriage 16 is provided at its forward end with an upstanding bracket 17 of relatively massive construction. On the forward face 18 of said bracket is supported, in any suitable manner, a motor 19, on the shaft 20 of which is mounted a friction cutting disk 21, whereby said cutting disk or saw is directly connected to the motor shaft. The said friction saw or disk is partially inclosed by a hood designated, as a whole, by 22.

Referring now to the mechanism shown in Figs. 1 and 2 for feeding the saw to its work, the same is made as follows: The hand feed mechanism embraces a horizontal feed shaft 25 which is rotatively mounted in suitable bearings in the bed plate frame and carries at its inner end a pinion 26, indicated in dotted lines in Fig. 1, that is operatively connected, as by a train of reducing gears 27, shown partially in dotted lines and partially in full lines in Fig. 1, to a longitudinal rack 28 which is attached to and depends from the carriage 16 between the sides of the carriage. 30 designates a hand feed wheel which is non-rotatively fixed to the said shaft 25, as by the key 26ª, whereby the carriage and the saw mounted thereon may be fed toward the work during the cutting operation, and may also be retracted from the work. The hand feed mechanism may be operated independently of the hydraulic, or pneumatic, feed mechanism, or in conjunction therewith as will hereinafter more fully appear.

Referring now to the power feed mechanism, which may be either hydraulic or pneumatic, the same is made as follows: 35 designates a cylinder which is arranged over the carriage and in longitudinal relation thereto, and is fixed to the carriage in any suitable manner, as by means of clamping brackets 36, 36, so as to move with said carriage. 38 designates a piston within the cylinder which is fixedly attached to a hollow piston rod 39 that extends rearwardly from the piston and through a suitable stuffing box 40 in the rear head of the cylinder. The said hollow piston rod is fixedly connected at its rear end to and is shown as closed by a boss 41 rigid with a bracket 42 which is attached to and extends upwardly from the rear extension 12 of the bed plate frame. The piston rod 39 is provided at its inner end, near the piston, with a port or ports 43, through which liquid or air may pass from the hollow piston rod to the cylinder space in rear of the piston. The hollow piston rod is connected at its outer end, outside of the cylinder 35, to a pipe 45 which leads to one branch 45ª of a four-way valve 46, supported on the base plate frame, which valve controls the flow of the motive fluid (either liquid or air) to the cylinder. The inlet branch 47 of the valve may be connected to any suitable source under pressure for supplying the motive fluid, and the outlet branch 47ª may be connected to any suitably located drain, when liquid is used, for the disposal of the liquid after its discharge from the cylinder. Extending through, and arranged concentrically within the hollow piston rod 39 is a pipe 48 which is exteriorly smaller than the bore of the piston rod, so as to leave an annular space in the hollow piston rod for the passage of the motive fluid therethrough. The said pipe 48 extends beyond the hollow piston rod into the piston and communicates with a port 49 therein so as to deliver motive fluid into the cylinder space between said piston and the forward end of the said cylinder. The pipe 48 is connected by a pipe 50 with one branch 50ª of the four-way valve 46, before referred to. The said valve 46 is provided with a controlling or actuating lever or element 52 which, when at one limit of its throw, acts on the valve plug to direct the flow of the motive fluid between the piston and one end of the cylinder and to direct the fluid from the other end of the cylinder through the discharge branch 47ª to the drain. When the valve lever is at the opposite limit of its throw, it acts on the valve plug to direct the flow of the motive fluid between the piston and the last mentioned end of the cylinder, and to direct fluid from the opposite end of the cylinder to the drain. The said valve actuating lever 52 normally occupies a neutral or central position, as shown in Fig. 1, in which position the source of motive fluid is not in communication with either end of the cylinder, but the discharge branch of the valve is in open communication with both ends of the cylinder 35. The lever is adapted to be swung to either limit of its throw through the medium of a hand lever 55 which is pivoted at 56 to a bracket 57 that is attached to and extends upwardly from the bed plate frame, the end of said lever below its pivot being connected by a link 58 to the upper end of said valve actuating or controlling lever.

The valve actuating or controlling lever 52 may be automatically thrown to neutral position to arrest the carriage at either limit of the movement of the carriage by means of tripping blocks 60, 61 which are mounted on a bar 62 attached in any suitable manner to the carriage. The valve lever is herein shown as provided with a bearing roller 63 adapted for contact by said tripping blocks, and the tripping blocks have cam shaped contact faces, so as to thereby bring the parts easily together without shock. Said tripping blocks are adapted to be adjusted longitudinally of the bar and to be locked in adjusted position by means of the hand screws 64.

When the machine is out of operation the lever 52 is in its neutral position. To feed the saw forward the hand lever 55 is drawn forwardly so as to swing the controlling lever 52 rearwardly. When the saw reaches the limit of its cutting movement the rear tripping block strikes the lever 52 and restores it to neutral position to arrest the saw and its carriage. To return the saw and its carriage, the lever 55 is swung rearwardly, thereby swinging the lever 52 forwardly, and the front tripping block strikes the lever 52 at the rearward limit of movement of the carriage to arrest the movement of the latter. Of course, the movement of the carriage may be directed wholly by the hand lever without the use of the automatic controlling devices. By opening the said valve more or less the action of the fluid to feed the disk to its work is regulated, so that the said disk may be fed with more or less speed or more or less power toward and against the work.

Referring now to the construction shown in Figs. 3 and 4, the cylinder 70 of the hydraulic, or pneumatic, feed mechanism is located at the side and near the bottom of the bed plate frame. Said cylinder is movable in a path parallel to that of the carriage, and is supported upon and moves along a track bar 71 arranged longitudinally on the bed plate frame; the track bar being supported on the frame by brackets 72, 72, 73. The cylinder 70 is guided on the track rail 71 by means of notched end collars 74, 74 and a notched central collar 75, the cylinder shell fitting tightly in said end collars and the central collar fitting tightly to the intermediate portion of the cylinder shell. The said collars are fastened together by the screw threaded tie rods 76 extending through the collars and screw threaded to receive clamping nuts 77. 80 designates a piston within said cylinder which is attached to the adjacent ends of oppositely directed hollow piston rods 81, 82, which latter extend through suitable stuffing boxes 83 at the ends of the cylinder. Said piston rods are attached in fixed relation to the bed plate frame, as by means of a bracket 85 at the front of the machine and the bracket 73 which supports the rear end of the track rail 71. The piston rods 81, 82 are provided at their inner ends, adjacent to opposite sides of the pistons, with ports 86, 87, respectively, through which the motive fluid is delivered to the cylinder space. The said piston rods are connected by means of the pipes 88, 89, respectively, with the branches 88$^a$, 89$^a$ of a four-way valve 90 which controls the flow of the motive fluid alternately to the cylinder spaces at opposite sides of the piston 80; said valve being provided with an inlet branch 91 adapted for connection with a source of fluid under pressure, and with an outlet branch 92 adapted to be connected with the drain. The said four-way valve is equipped with an actuating or controlling lever 92$^a$ and operates said valve in the manner herein described with respect to the valve 46, to alternately connect the opposite ends of the cylinder to the source of fluid supply under pressure, and to the drain. The said valve 90 is actuated by means hereinafter described to thus control the passage of the motive fluid to the cylinder. The cylinder carries at its upper side a longitudinally arranged rigidly connected rack bar 93 which meshes with a pinion 94 rotatively mounted on a stub shaft 95 rigidly fixed to the adjacent side of the bed plate frame. 96 designates a gear wheel which is keyed to a sleeve 97 integral with or fixed to the pinion 94. The wheel 96 meshes with a pinion 98 which is normally loose on a feed shaft 99 that is rotatively mounted in the wall of the bed plate frame and extends inwardly toward the transverse center of the frame. The said pinion 98 is adapted to be locked to the feed shaft 99 by clutch mechanism to be hereinafter described, and when so locked to the shaft the rotation of the rack driven gear wheel 96 transmits rotary movement to the feed shaft 99. The said feed shaft 99 is provided at its inner end with a pinion 100 which meshes with the terminal one of a train of pinions and gears 101, 102, 103, the latter meshing with a rack bar 104 which is fixed to and depends from the carriage 16.

When the saw is to be fed by the hydraulic or pneumatic mechanism described, the actuating lever 92$^a$ of the valve 90 is swung in one direction by a lever 105 which is pivoted at 106 to a bracket 107 that is attached to the bed plate frame, the hand lever being connected by a link 108 to said valve actuating lever. When the lever is swung in one direction by the mechanism described, the motive fluid passes into the front end of the cylinder through the pipe 88 and the hollow piston rod 81 and moves the cylinder forwardly, and said cylinder acts, through the rack and gear mechanism described to move the carriage and therefore the saw forwardly toward the work. When the valve actuating lever is swung in the opposite direction by the hand lever 105, the motive fluid passes into the rear end of the cylinder and acts in a reverse manner to retract the carriage and saw. The said four-way valve 90 is actuated by hand through the lever 105 to start the saw in either direction, and the valve actuating lever 92$^a$ may be acted upon at the forward and rearward limits of movement of the carriage by tripping blocks 110, 111 to swing the said valve actuating lever to neutral position and thereby arrest the carriage and saw, said tripping blocks being carried by the carriage in the same manner as are the tripping blocks of the previously described construction.

The saw carriage is adapted to be actuated to advance the saw toward the work by hand through the medium of hand feed wheel 116, the hub 117 of which is keyed or otherwise non-rotatively mounted on the feed shaft 99. When the saw is fed to the work by the hand feed wheel the pinion 98 is unclutched from the feed shaft 99 so that said shaft may rotate freely relatively to the hydraulic (or pneumatic) feed mechanism. The said pinion 98 may be clutched to the feed shaft 99, when the saw is to be fed to the work by hydraulic (or pneumatic) mechanism by means made as follows: The hub 115 of the said pinion 98 is provided at its outer end with a conical socket 118 adapted to receive the inner end extension 120 of the hub of the hand feed wheel 116, the said feed wheel hub extension being movable toward and from the socketed hub of the pinion 98. The clutch elements thus arranged are adapted to be forced into clutching position to lock the pinion 98 to the feed shaft 99 by means of a sleeve nut 121 that is screw threaded to the outer reduced end of the feed shaft 99 and a rotative collar 122 that is splined to said sleeve nut so as to be nonrotative thereon, but adapted to slide endwise thereof and is provided with a hand wheel 123. When the sleeve nut is turned inwardly by hand power applied through the wheel 123, the clutching elements are brought into clutching engagement to clutch the pinion 98 to the feed shaft 99. Said sleeve nut 121 is provided at its inner end with a flange 125 which fits in a socketed portion of the hand feed wheel hub behind a ring 126 attached to said hub, whereby, when said sleeve nut is turned outwardly, the clutch elements are separated, so as to thereby release the pinion 98 from the feed shaft. The hub of the pinion 98 is held from endwise movement on the shaft 99 by means of a collar 128 keyed or otherwise secured to said shaft and provided with a flange 129 which fits into a socket in the rear end of the said hub and behind a ring or washer 130 attached to the said rear end of the hub. The rack bar 93 is flanked by side plates 132, 132, which extend above the rack bar in guiding relation to the sides of the pinion 94, so that said bars and the rack bar act in conjunction with the notched collars 74 and 75 and the track bar 71 to guide the cylinder 70 and hold it in place.

I claim as my invention:—

1. In a metal cutting machine, a frame, a high speed motor and direct connected cutting disk guided by and movable on the frame toward and from the work, fluid controlled means for controlling the feed movement of the cutting disk to move the disk toward and away from the work and manual means for also controlling the feed movement of the disk and operable independently of and also in conjunction with the fluid controlled means.

2. In a metal cutting machine, a work support, a high speed motor and direct connected cutting disk operatively associated with and movable toward and from the work support, a cylinder and a piston therein, one of which is fixed and the other of which is operatively connected to the disk to shift the same toward and from the work support, a four-way valve connected to a source of supplying fluid under pressure and communicating with the cylinder on opposite sides of said piston, means movable with the disk and operative at the limits of its movement to actuate said valve to arrest the disk, manual means to actuate said valve to feed and retract the disk and manual means for shifting the disk, operative independently of or in conjunction with the power means.

3. In a metal cutting machine, a work support, a high speed motor and direct connected cutting disk operatively associated with and movable toward and from the work support, power feed mechanism for the disk comprising a cylinder operatively geared to said disk, a fixed piston therein, a four-way valve connected to a source supplying fluid under pressure, and connected to the cylinder on opposite sides of said piston, manual means acting on the valve to admit fluid under pressure to the cylinder at either side of said piston, means movable with the disk and operative at the limits of its movement to actuate said valve to arrest the disk, and manual feed means for the disk operative independently of or in conjunction with the power feed means.

4. In a metal cutting machine, a work support, a high speed motor and direct connected cutting disk operatively associated with and movable toward and from the work support, power feed mechanism for the disk comprising a cylinder operatively geared to said disk, a fixed piston therein, a four-way valve connected to a source supplying fluid under pressure and connected to the cylinder on opposite sides of said piston, an actuating lever for said valve, a hand lever operatively connected thereto to open the valve, tripping means movable with the cutting disk and adapted to engage said valve lever at each limit of movement of the disk to close the valve, and hand-feed means for the disk adapted to be operated independently of or in conjunction with the power feed means.

5. In a metal cutting machine, a work support, a carriage movable toward and from the work support, a high speed friction disk and direct connected motor carried by said carriage in operative relation to said work support, a cylinder fixed to and also carried by the carriage, a piston therein, a fixed hollow piston rod fixed to the piston and communicating with the cylinder at one side of the piston, a pipe extending through the hollow piston rod and communicating with the cylinder on the other side of said piston, a four-way valve connected to said pipe and hollow piston rod and to a source supplying fluid under pressure, means for actuating said valve, and manual means to independently feed the carriage toward and from the work.

6. In a metal cutting machine, a work support, a carriage movable toward and from the work support, a high speed friction disk and directly connected motor carried by said carriage in operative relation to said work support, a cylinder fixed to and also carried by the carriage, a piston therein, a fixed hollow piston rod fixed to the piston and communicating with the cylinder at one side of the piston, a pipe extending through the hollow piston rod and communicating with the cylinder on the other side of the said piston, a four-way valve connected to said pipe and hollow piston rod and to a source supplying fluid under pressure, manual means for opening said valve, and automatic means operative at either limit of movement of the carriage for closing the valve.

7. In a metal cutting machine, a work support, a carriage movable toward and from the work support, a high speed friction disk and operatively connected motor carried by said carriage in operative relation to said work support, a cylinder fixed to the carriage, a piston therein, a fixed hollow piston rod fixed to the piston and communicating with the cylinder at one side of the piston, a pipe extending through the hollow piston rod and communicating with the cylinder on the other side of said piston, a four-way valve connected to said pipe and hollow piston rod and to a source supplying fluid under pressure, manual means for controlling said valve, and manual means operatively connected to the carriage and adapted to shift the carriage toward and from the work support, either independently or in conjunction with the power feed means.

8. In a metal cutting machine, a work support, a carriage movable toward and from the work support, a high speed friction disk and directly connected motor carried by said carriage in operative relation to said work support, a cylinder fixed to and also carried by the carriage, a piston therein, a fixed hollow piston rod fixed to the piston and communicating with the cylinder at one side of the piston, a pipe extending through the hollow piston rod and communicating with the cylinder on the other side of said piston, a four way valve connected to said pipe and hollow piston rod and to a source for supplying fluid under pressure, an actuating lever for said valve, a hand lever connected thereto to open and close the valve, and tripping means carried by the carriage near its front and rear ends, respectively, and adapted to engage the valve actuating lever at the respective limits of movement of the carriage to thereby arrest the carriage at either limit of its movement.

9. In a metal cutting machine, a frame, a high speed motor and direct connected cutting disk guided by and movable on the frame toward and from the work, fluid controlled means to feed the cutting disk toward the work and to retract it therefrom, manual means to also feed the disk toward and retract it from the work, means to control the action of the fluid to feed the disk toward the work and means whereby the disk is retracted from the work without substantial resistance offered thereagainst by the fluid means throughout the full retractive movement of the disk.

10. In a metal cutting machine, a work support, a high speed motor and direct connected cutting disk operatively associated with and movable toward and from the work support, a cylinder and a piston therein, one of which is fixed and the other of which is operatively connected to the disk to shift the disk toward and from the work, a valve connected to a source supplying fluid under pressure and communicating with the cylinder on both sides of said piston, and provided with an actuating member, tripping blocks movable with the disk and adapted to engage the valve actuating member to arrest the disk at both limits of its movement, said blocks being adjustable toward and from each other to vary the travel of the disk with means to lock the blocks in different fixed adjustments, and a hand lever connected to said valve to also actuate the same to thereby control the feed movement of the disk.

11. In a metal cutting machine, a work support, a high speed motor and direct connected cutting disk operatively associated with and movable toward and from the work support, a cylinder and a piston therein, one of which is fixed and the other of which is operatively connected to the disk to shift the disk toward and from the work, a valve connected to a source supplying fluid under pressure and communicating with the cylinder on both sides of said piston, and provided with an actuating member, tripping blocks movable with the disk and adapted to engage the valve actuating member to arrest the disk at both limits of its movement, said blocks being adjustable toward and from each other to vary the travel of the disk with means to lock the blocks in different fixed adjustments, a hand lever connected to said valve to also actuate the same to thereby control the feed movement of the disk and manual means for also shifting the disk toward and from the work.

In testimony, that I claim the foregoing as my invention I affix my signature in the presence of two witnesses, this 5th day of September, A. D. 1913.

EDWARD T. HENDEE.

Witnesses:
E. M. JANS,
W. L. HALL.